Figure 1:
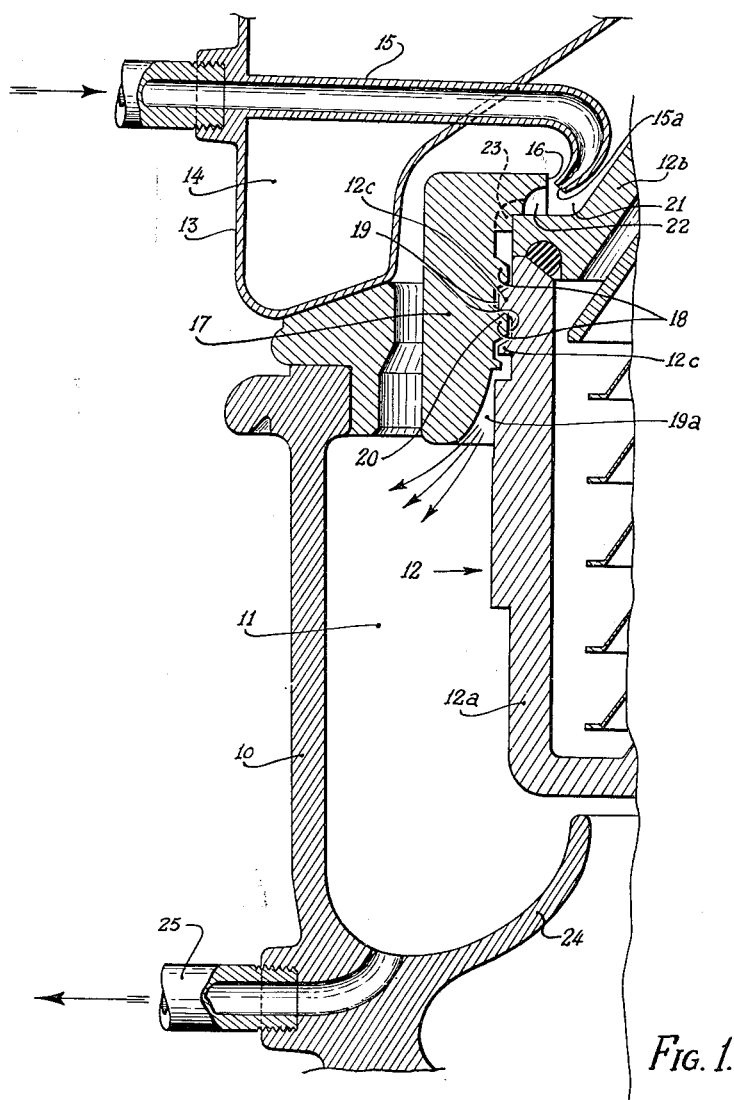

Oct. 9, 1956

G. J. STREZYNSKI 2,765,978

TEMPERATURE CONTROL FOR CENTRIFUGES

Filed Jan. 29, 1953

INVENTOR.
GEORGE J. STREZYNSKI
BY Davis, Sorier Faithfull

ATTORNEYS

United States Patent Office 2,765,978
Patented Oct. 9, 1956

2,765,978

TEMPERATURE CONTROL FOR CENTRIFUGES

George J. Strezynski, Poughkeepsie, N. Y., assignor to The De Laval Separator Company, Poughkeepsie, N. Y., a corporation of New Jersey Application January 29, 1953, Serial No. 333,859

11 Claims. (Cl. 233—11)

This invention relates to centrifuges and particularly to a centrifuge having an improved arrangement for controlling the temperature of the fluid in the centrifugal bowl.

In many processes using centrifugal separators or clarifiers, it is necessary to maintain a close temperature control of the fluid or liquid mixture being processed. In the field of anti-biotics, for example, temperature control is of prime importance, and maximum permissive temperatures must not be exceeded or the anti-biotic being processed becomes spoiled and unfit for future use. While it is possible, of course, to effect a close control of the temperature at which the liquid mixture is fed to the centrifugal bowl, such external temperature control is inadequate in many cases, usually because of the tendency of the mixture to undergo temperature changes in the bowl itself during the centrifugal treatment. Investigations have shown that heat is added to the liquid in the centrifugal bowl, mainly through the air friction between the exterior of the rotating bowl and the surrounding air. Heat is also created, though to a lesser degree, through friction in the supporting bearings, the driving gears, and the like, and by the flow resistance of the liquid as it passes through the centrifugal bowl.

Various arrangements for controlling the temperature in a centrifugal bowl have been proposed heretofore, these arrangements usually including a heating or cooling coil in the space between the rotating bowl and the stationary housing. These prior arrangements, however, are not satisfactory, principally because they do not enable a sufficiently close temperature control of the liquid in the bowl, or they unduly complicate and encumber the centrifuge or both.

It is an object of this invention to provide a centrifuge having a simple and compact arrangement by which the temperature of a liquid passing through the centrifugal bowl may be controlled within close limits.

A centrifuge made according to the present invention comprises a stationary frame forming a chamber for the rotating centrifugal bowl, there being an annular space between the peripheral wall of the bowl and the periphery of the chamber. Surrounding the bowl and carried by it is an external ring which forms with the bowl periphery an elongated passage having spaced, serially connected turns. This passage has an outlet end opening into the space between the bowl and the chamber periphery. A supply duct, preferably stationary and mounted on the frame, is positioned to deliver a thermal fluid, that is, a heating or cooling fluid, to the inlet end of the elongated passage. Thus, the fluid first flows through this passage in direct contact with the peripheral wall of the bowl so that an efficient heat exchange is effected between the thermal fluid and the liquid in bowl at the other side of the wall; and then as the thermal fluid escapes through the discharge end of the passage it is sprayed into the space between the bowl and the chamber periphery due to the rapid rotation of the bowl. By reason of this spraying of the fluid, it is better adapted to influence the temperature in the space surrounding the rotating bowl, so as to maintain this temperature substantially constant in spite of its tendency to change for any reason, such as the heat from air friction. The sprayed fluid may then be collected in the lower part of the space surrounding the bowl and removed through a discharge pipe.

It will be understood that the elongated fluid passage formed by the ring may have its turns extending circumferentially of the bowl, or parallel to the bowl axis, or in some other fashion; but in any case the passage turns extend over a substantial area of the bowl periphery and preferably over a zone of considerable depth extending entirely around the bowl. In this way, the heat exchange between the thermal fluid in the passage and the liquid in the bowl is not confined to a local area and is sufficient, for example, to counteract a temperature rise of the process liquid within the bowl due to its flow resistance and to the bearing friction, etc., previously mentioned.

In the preferred construction, the turns of the fluid passage formed by the ring extend completely around the bowl in a helix, the passage being formed by interengaging threads on the bowl and ring. At least one of these threads has its root cut deeper than is necessary to accommodate the other mating thread, so that the resulting clearance forms the helical passage. Thus, when the bowl is of the type having a main shell forming the centrifugal locus, and a removable bowl top on the shell, the ring may be provided with a part overlying the bowl top so that the latter is clamped on the shell when the ring is screwed down by means of the threads on the shell. In this way, the ring serves the dual functions of holding the bowl top on the shell and forming the thermal fluid passage around the bowl. Preferably, the part of the ring overlying and clamping the bowl top forms with the latter an annular recess which receives or collects the thermal fluid from a stationary supply duct overlying the bowl; and this recess communicates with the inlet or upper end of the helical passage formed by the ring and bowl threads but is spaced therefrom toward the bowl axis. Accordingly, the centrifugal force acting upon the rotating body of fluid in the collecting recess acts to force the fluid along the helical passage to its discharge end, so that it is not necessary to rely upon gravity or other means for this purpose. The helical passage may be arranged so that its turns extend around the bowl, from inlet to outlet end of the passage, in the direction opposite to the direction of rotation of the bowl, so that the bowl rotation assists the flow of the thermal fluid through the passage.

Figure 2:
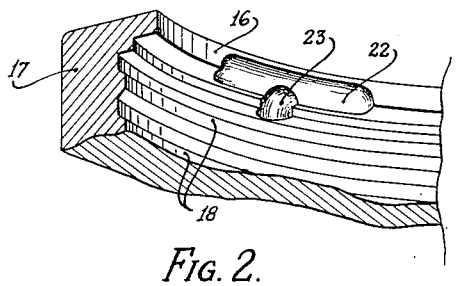

For a more complete understanding of the invention, reference may be had to the following description of the presently preferred embodiment of the invention, which refers to the accompanying drawing wherein:

Figure 1 is a vertical sectional view of part of the centrifuge, showing the temperature controlling arrangement, and Figure 2 is a perspective view of the under side of a portion of the demountable ring or band normally mounted on the bowl, and showing part of the helical passage.

The separator frame 10 forms at its upper part a chamber 11 containing the centrifugal bowl 12, which defines a locus of centrifugal force for the liquid being processed. The bowl 12 is supported by a rotatable spindle (not shown) arranged in the usual manner in the frame 10. The details of the bowl may vary to suit particular requirements. For example, they may follow the disclosure of Strezynski Patent No. 1,950,868, dated March 13, 1934.

Preferably, the bowl comprises a main shell 12a forming the locus of centrifugal force, and a removable conical bowl top 12b on the shell which permits access to the interior of the shell.

The chamber 11 of the frame is closed at the top by a removable cover 13 mounted on the frame and forming a collecting chamber 14 into which one of the mixture components separated in the bowl is discharged by way of an outlet (not shown) in the bowl top 12b. Extending through the walls of cover 13 is a thermal fluid supply duct 15. The discharge end 15a of the duct is arranged to direct the flow of fluid downward and radially outward from the bowl axis against a vertical peripheral flange 16 formed as part of a demountable ring 17 affixed to and surrounding the outside of the peripheral wall of bowl 12. The ring flange 16 extends slightly above and overlies the lowermost or outer surface of the bowl top 12b. Below the flange 16, the interior surface of the demountable band 17 is provided with a thread 18 engaging a thread 12c on the bowl shell 12a, these threads extending circumferentially around the bowl in helices. As shown, the root of each thread is cut substantially deeper than is necessary to accommodate the other thread, so that the threads form a helical passage 19 starting adjacent the bowl top 12b and spiralling downward around the bowl. At its lower end, the passage 19 opens downward and outward in the chamber 11 surrounding the bowl, as shown at 19a. Thus, the passage 19 consists of a number of serially connected turns around the bowl, these turns being separated by the interengaging parts of the threads, as shown at 20.

The flange 16 of the ring forms with the bowl top 12b an annular recess or trough 21 extending around the bowl top. This trough is located at a shorter radius from the bowl axis than the ring 17 and passage 19. On the inner face of the flange 16, there are formed one or more intercommunicating ducts 22 and 23 leading radially outward from the trough 21. If more than one set of ducts 22—23 is used, the sets are preferably spaced equidistantly around the trough. Each duct 22 extends circumferentially in the face of the flange, while the duct 23 extends vertically in the flange face between duct 22 and the upper end of the helical passage 19. It will be noted that duct 23 extends over and partly around the corner of bowl top 12b where it is clamped down by the overlying part of flange 16.

The frame has an annular part 24 at the bottom of chamber 11 forming a trough or collector for fluid discharged from the passage outlet 19a. The fluid is led away from the collector through a discharge pipe 25.

In the operation of the centrifuge, a thermal fluid, for example cold water, is passed through the stationary supply duct 15 into the external annular collecting recess 21. Since the bowl is rotating, the cooling liquid will pass along the flange face to the duct 22 from which it will be conducted via duct 23 to the upper or inlet end of spiral passage 19. Due to the rotation of the bowl and the inward location of duct 22 relative to passage 19, the cooling liquid will be urged by centrifugal force through duct 23 and passage 19. After spiralling downward around the bowl by way of passage 19, the cooling liquid will discharge from the lower end 19a of this passage into the chamber 11, and be led away therefrom through the discharge pipe 25.

With this construction, temperature control of the liquid undergoing separation in the centrifugal bowl 12 is effected in two ways. As the coolant spirals around the upper zone of the bowl periphery, that is, the portion of the bowl wall which is surrounded by the demountable ring 17, a heat transfer is effected directly through the bowl wall between the liquid being processed within the bowl and the cooling liquid passing through the passage 19, which will be sufficient to overcome any temperature rise of the process liquid within the bowl due to the flow resistance, bearing friction, etc. previously mentioned. The second and greatest source of temperature rise in the process liquid, that is, the temperature rise due to air friction between the bowl 12 and the surrounding air in chamber 11, is counteracted by the coolant discharging from the demountable ring 17 at 19a and passing through the chamber 11 in the form of a spray or mist. In other words, the rapid rotation of the bowl causes the liquid to become more or less atomized as it discharges through the passage outlet 19a, which preferably extends substantially around the bowl. The coolant is caught and collected in the trough 24 at the base of the chamber, and is then lead away via discharge pipe 25. In passing the coolant in the form of a spray through chamber 11, a very efficient heat transfer from the air within the chamber takes place, which experience has shown to be more than enough to counteract the normal temperature rise within the bowl due to air friction.

The present invention requires only a relatively simple modification of conventional centrifuges, since it is common practice to provide a two-piece bowl, as previously described, and to clamp the bowl top on the main shell by a demountable ring. It is a simple matter to modify this ring, according to the present invention, by cutting its helical groove or thread root deeper than necessary (and similarly cutting the mating thread on the bowl shell, if desired), in order to form the helical passage 19, and providing the inlet channel 22—23 for introducing the thermal fluid into this passage. The fluid supply pipe 15 may be readily fitted in the cover 13 or otherwise mounted on the frame.

When the thermal fluid passage 19 is arranged in the form of a helix, as described, it preferably spirals downward in the direction opposite to the direction of rotation of the bowl 12. In this way, the thermal fluid does not have to run ahead of the bowl in order to flow through the passage.

I claim:

1. In a centrifuge having a stationary frame forming a chamber, and a centrifugal bowl having two separable parts rotatable in the chamber, the peripheral wall of the bowl being spaced from the chamber periphery, the improvement which comprises an external ring on the bowl holding said parts together and forming therewith an elongated passage having spaced, serially connected turns, said passage having an outlet end opening into the space between the bowl and the chamber periphery, and a supply duct for delivering a thermal fluid to the other end of said passage, whereby the fluid flows through said passage in contact with the peripheral wall of the bowl and is then sprayed into said space.

2. The improvement according to claim 1, comprising also a part on the frame underlying said space and forming a collector for the fluid sprayed from said passage, and a discharge pipe leading from said collector.

3. The improvement according to claim 1, in which said supply duct is stationary and is mounted on the frame.

4. The improvement according to claim 1, in which said passage extends circumferentially around the bowl in the form of a helix.

5. The improvement according to claim 1, in which the bowl at least partly defines an external fluid-collecting recess communicating with said other end of the passage and to which the supply duct leads.

6. The improvement according to claim 1, in which the bowl at least partly defines an external fluid-collecting recess communicating with said other end of the passage and to which the supply duct leads, said recess being spaced toward the bowl axis from said passage.

7. The improvement according to claim 1, in which said separable parts include a main shell and a removable top on the shell, said ring engaging both the top and the shell to hold the top on the shell.

8. The improvement according to claim 1, in which said separable parts include a main shell and a removable top on the shell, the ring and shell having interengaging threads forming said passage, and the ring having a part overlying said top and being screwed onto the shell by means of said threads to clamp said top to the shell.

9. In a centrifugal bowl having a main shell forming a separating chamber, and a bowl top removably mounted on the shell, a bowl ring surrounding the shell and having a part overlying the bowl top, and interengaging threads on the ring and shell having the root of at least one of the threads cut deeper than is necessary to accommodate the other mating thread, the threads thus forming a helical fluid passage extending around the bowl, said passage having an inlet end adjacent the bowl top and an outlet end at the lower portion of the ring, the ring being screwed onto the shell by means of said threads to engage said part with the bowl top and thereby clamp the top to the shell.

10. A centrifugal bowl according to claim 9, in which said overlying part of the ring and the bowl top form a fluid-collecting recess communicating with the inlet end of said passage.

11. A centrifugal bowl according to claim 9, in which said overlying part of the ring and the bowl top form an annular fluid-collecting trough located at a shorter radius from the bowl axis than said passage, said trough communicating with the inlet end of said passage.

References Cited in the file of this patent

UNITED STATES PATENTS 1,482,229    Hapsgood _____ Jan. 29, 1924